United States Patent [19]

Dunn et al.

[11] 4,058,678

[45] Nov. 15, 1977

[54] REMOTE SIGNALLING TO A TELEPHONE LINE UTILIZING POWER LINE CARRIER SIGNALS

[75] Inventors: Robert T. Dunn, Bedford; William M. Brown, Hudson; John M. Ruddy, Sudbury, all of Mass.

[73] Assignee: Astech, Inc., Bedford, Mass.

[21] Appl. No.: 674,557

[22] Filed: Apr. 7, 1976

[51] Int. Cl.² .......................................... H04M 11/04
[52] U.S. Cl. ................................ 179/2.5 R; 179/2 A
[58] Field of Search ................... 179/2 A, 2 R, 2.5 R, 179/2 E, 5 R, 5 P, 1 H, 18 AD, 37-40; 325/37, 394, 310; 340/216, 224, 288

[56] References Cited

U.S. PATENT DOCUMENTS

| | | | |
|---|---|---|---|
| 2,567,908 | 9/1951 | Levy | 340/216 |
| 3,280,259 | 10/1966 | Cotter | 179/2.5 R |
| 3,492,426 | 1/1970 | Foreman et al. | 179/2 A |
| 3,521,267 | 7/1970 | Lester et al. | 179/2.5 R |
| 3,529,216 | 9/1970 | Kolm et al. | 325/394 |
| 3,614,326 | 10/1971 | Cameron | 179/2 A |
| 3,886,534 | 5/1975 | Rosen et al. | 340/216 |
| 3,949,172 | 4/1976 | Brown et al. | 179/2.5 R |

Primary Examiner—Kathleen H. Claffy
Assistant Examiner—Gerald L. Brigance Attorney, Agent, or Firm—Robert T. Dunn

[57] ABSTRACT

A remote transmitting or receiving device (T/R device) communicates with a conventional subscriber telephone through available AC power wires which carry signals that may be modulations of RF carrier frequencies and which are coupled to the power wires. For example, an incoming telephone call includes signals that are detected and modulate a master RF carrier frequency which is coupled to the AC power wires at the telephone line location and these signals are coupled from the AC power wires at a remote R device location, and, demodulated and used to control an electrical appliance, motor, pump, etc. The remote T device which may be, for example, a fire detector produces signals which modulate a remote RF carrier frequency which is coupled to the AC power wires at the remote location and this modulated carrier is coupled from the AC power wires and demodulated at the telephone line location to control or initiate signals in suitable form for transmission over the telephone line. Thus, telephone calls to the subscriber's telephone line can be received at the remote location to turn on an electrical device at that location; or signals originating at the remote location initiate a telephone call and message from the transcriber's telephone line.

8 Claims, 8 Drawing Figures

REMOTE SIGNALLING TO A TELEPHONE LINE UTILIZING POWER LINE CARRIER SIGNALS

BACKGROUND OF THE INVENTION

This invention relates to telephone extension systems providing a remote transmitting and/or receiving device which communicates over AC power wires with a subscriber's telephone line. More particularly, the present invention provides apparatus for communicating over AC power wires between a remote location and a conventional telephone line.

Heretofore, it has been proposed to provide a remote device (an extension telephone) communicating with a conventional on line telephone through transmission means other than a conventional extending telephone line. Various wired and wireless telephone extension systems have been proposed. The wireless systems consist of transmitting and receiving radios at the on line telephone and at the extension telephone. These systems encounter unique problems relating to the power and frequency of radiated signals as well as other problems of signal loss between the on line and extension phones due to physical shielding between them. Furthermore, since all signals between the on line and extension telephones are transmitted, they can be intercepted and interferred with freely by anyone within range.

The wired telephone extension systems that have been proposed make use of the AC power lines for communicating between the on line and the extension telephones. In these, the subscriber's on line telephone which is connected directly to the telephone line, is specially equipped with an acoustical microphone and speaker that communicate audio signals to the on line telephone and the acoustical devices are contained in an auxiliary unit that goes alongside the on line telephone and holds the telephone handset. These acoustical devices, in turn, communicate electrically with an extension telephone, through the available AC power wires and when this system is in use, an incoming telephone call can be answered at the extension telephone as well as at the on line telephone. However, the incoming call cannot be answered at both the on line and the extension telephones, because when the on line handset is removed from the auxiliary unit, the acoustical couplings are broken and then the extension telephone is incapable of either receiving or transmitting to the on line telephone. Furthermore, the acoustical devices at the auxiliary unit will pick up surrounding noise as well as the voice signals and this noise will be transmitted along with the voice signals to the telephone line or over the AC power line to the extension telephone.

SUMMARY OF THE INVENTION

In accordance with the present invention, communication with a subscriber's conventional telephone line is extended to a remote transmitter or receiver device (T/R device) through available AC power wires at the subscriber's home or office. This extension communication system includes electrical circuits which connect directly to the telephone line and if the remote device is a receiver device (R device), the circuits detect signals carried on the telephone line. For example, the telephone line signals may be coded to control a specific appliance, motor or light at the subscriber's home. When detected, they are applied to a modulator which modulates an RF carrier frequency, (called the master carrier frequency), producing modulated master carrier signals which are coupled to the available AC power wires at one location thereof, (referred to herein as the master station), so that the power wires carry the modulated master carrier signals to one or more remote stations connected to the AC power wires, referred to herein as remote receiver stations, where the modulated carrier signals are received by a remote R device and demodulated to produce signals that control or initiate operation of the particular electrical appliance, motor, or light.

In another embodiment of the present invention, special or coded signals generated at the remote station by, for example, a fire or burglar detector, modulate an RF carrier frequency, (called the remote carrier frequency), which is coupled to the AC power wires at the remote station. These signals are coupled from the AC power wires at the master station, then demodulated and converted into suitable form for controlling a telephone call device that automatically dials the local fire or police station and delivers a pre-recorded message. Thus, the emergency fire or burglar intrusion is immediately communicated to the fire or police department even when the subscriber is not at home. By using the AC power wires to carry the alarm signal from the detector to the telephone, extensive wiring of the subscriber's home connecting the fire and burglar detectors to the telephone is avoided.

In all embodiments of the present invention, the electrical circuits which connect directly to the telephone line impose an impedance on the telephone line which is equivalent to the impedance imposed on the line by a conventional telephone connected thereto. Furthermore, the remote T or R devices are operable with or without a conventional telephone on the telephone line. Also, any number of remote T or R devices may communicate with the telephone line. In the use of remote R devices, all may receive specially coded signals at the same time and carry out their particular control functions, since each responds only to the signals encoded for it.

In a subscriber's home where both fire and burglar detection systems are in operation, each fire detector signal may modulate the same remote RF carrier frequency, and each burglar detector may modulate the same remote RF carrier frequency. At the master location a receiver connected to the AC power wires detects all modulations and discriminates only between those that are fire and those that are burglar. Whichever of these is received first initiates the call out to the fire or police departments.

It is one object of the present invention to provide apparatus for communication between a telephone line and a location which is remote from the telephone line wherein at least some of the disadvantages of the prior wired and the wireless systems are avoided.

It is another object to provide apparatus for communication between a remote location and a conventional on line telephone via available AC power wires.

It is another object to provide apparatus for communication between a conventional on line telephone and transmitters or receivers at remote locations through available AC power wires where no acoustical coupling is required to the on line telephone.

It is a further object to provide at a telephone subscriber's home a system that receives incoming telephone line signals and controls the energization of electrical devices on the AC power line depending upon encodement of the telephone line signals.

It is another object to provide at a telephone subscriber's home a system that responds to detectors, such as fire or burglar detectors at remote locations in the home, that connect to the subscriber's AC power line and automatically signal an alarm or message to the fire or police department.

Other objects, features and advantages of the present invention will become apparent in view of the following descriptions of specific embodiments which represent the best known uses of the invention, described herein with reference to the drawings.

DESCRIPTION OF EMBODIMENTS OF THE INVENTION

A composit of embodiments of the present invention incorporating substantially all the features of the invention includes a remote appliance control station and a remote fire detector station that couple electrically directly to the available AC power wires, and communicate with a master transmit-receive unit (master TR unit) at the master station which connects directly to the available AC power wires and also couples to the telephone line on which there is a conventional on line telephone. This system is illustrated pictorially in FIG. 1. The master TR unit serves as an interface between the subscriber's line and the available AC power wires. These power wires act as a transmission medium for the signals on the telephone line and, in effect, carry these signals to all of the remote stations and also carry signals from the remote fire detector stations to the telephone line. Any number of remote stations may be used in this system. Each appliance station responds to a different frequency tone. All fire detector stations transmit the same frequency. To initiate operation, it is only required that the appliance and/or fire detector stations be plugged into the AC power wires. Thus, every AC power outlet connected to the power wires can be used as a remote station of either kind.

Figure 1:
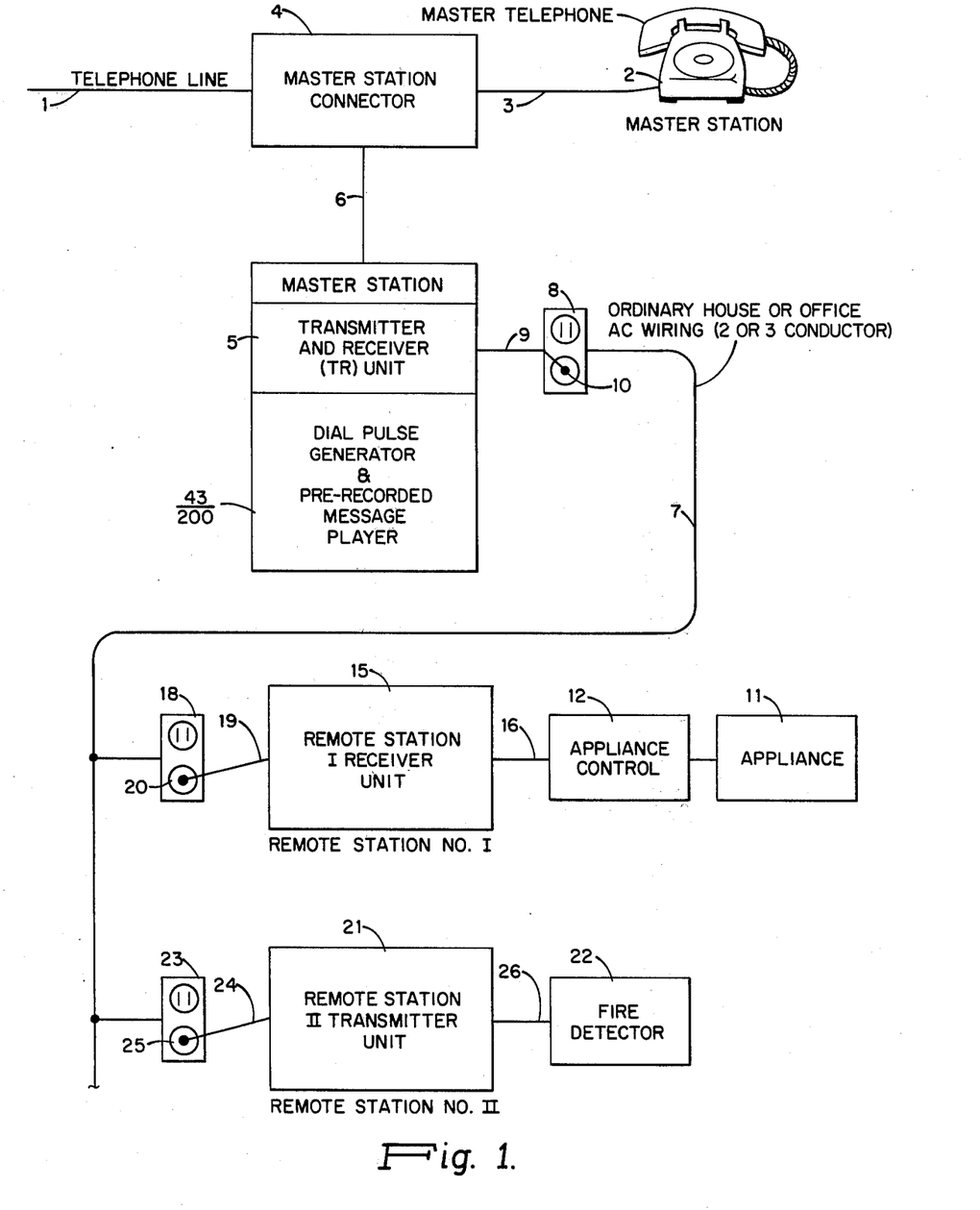
FIG. 1 is a pictorial representation of a conventional telephone which communicates with two remote stations, station I, which is a receiver station and station II, which is a transmit station via available AC power wires, for example, at station I, an appliance is controlled and at station II, a fire alarm signal is transmitted.

Turning to FIG. 1, there is shown the subscriber's telephone line 1 and the subscriber's on line telephone 2 (herein called the master telephone). Both the telephone line and the master telephone are of conventional design and are usually provided by the local telephone company. For purposes of example, the telephone system described herein is a conventional system sometimes referred to as a common battery telephone system which provides a telephone line to each subscriber. The subscriber's telephone is on the line at all times and is energized by direct current over the telephone line from a central telephone switching system which may be a PBX, panel, step by step, crossbar or electronic switching system.

In a preferred embodiment of the present invention, both the telephone line 1 and the line 3 from the master telephone connect together through a master station connector 4. This connector is merely a feed through with respect to lines 1 and 3. In addition, the connector provides telephone line connection to the master station TR unit 5. This connection is line 6 and may be no different than the telephone line connection to a conventional telephone line extension phone. Hence, the connector 4 may be a conventional telephone extension receptacle.

The master station TR unit, connects directly to the available AC power wires 7. This connection is conveniently through a conventional AC power receptacle 8 and includes a power wire 9 from the master unit with a conventional plug 10 at the end of this wire to accomodate the receptacle.

The master TR unit performs numerous functions. For example, it is a buffer between the telephone line 1 and the AC power wires 7 so that there is no direct 60 cycle AC electrical connection between the telephone line wires and the power wires. In addition, the master unit imposes a conventional impedance load on the telephone line, via line 6 and the connector 4, so that the telephone line is at all times electrically loaded as required by the central switching system, whether or not the subscriber's master telephone 2 is on the line. The structure and the other functions of the master TR unit, (automatic answering incoming calls and making an emergency call), are more fully described herein.

For purposes of example, two remote stations are shown in FIG. 1, numbered I and II and both are plugged into the AC power wires via conventional power receptacles. Station I is a typical appliance control station for controlling AC power to appliance 11 in response to signals received from the telephone line 1. Station II is a typical detector station, for example, a fire detector station and only transmits signals to the telephone. Clearly, any number of either kind of remote station can be added and any number can be on the power line at the same time. Since all the remote stations of the same kind may be the same, except that each appliance station responds to a different incoming signal. Only one station of each kind is described herein in detail.

The remote station I, the appliance station, includes a remote receiver unit 15 which couples the appliance control 12 to the station AC power outlet 18 and the appliance control 12 controls AC power to the appliance 11. This connection is made by an AC power connecting line 19 from the receiver unit with an AC plug 20 at the end which plugs into the receptacle 18. The receiver unit 15 and the appliance control 12 are connected by lines 16. These lines, the receiver unit and the appliance control are described herein in further detail.

An alarm station like the fire detector station II includes a remote transmitter unit 21 which couples the fire detector 22 to the station AC power outlet 23. This connection is made by an AC power connecting line 24 from the transmitter unit with an AC plug 25 at the end which plugs into the receptacle 23. The transmitter unit 21 and the fire detector 22 are connected by lines 26. These lines, the transmitter unit and the fire detector are described in further detail herein.

There is no limitation to the number of remote stations of both kinds that can be employed on the AC power line at any one time. The only limitation might be the length of the AC power line and the number of loads that can be imposed on the line at any one time which may absorb the carrier frequency signals transmitted between the remote stations and the master station. This problem can be partially overcome by employing relatively high carrier frequency power and selecting carrier frequencies which are readily detected at the master and remote stations even though they are very substantially attenuated in the AC power lines. In addition, suitable filters at the master and remote T or R units, are provided to screen out noise from the AC power system and enable clear detection of the carried signal even in the presence of a high level of noise.

Figure 2:
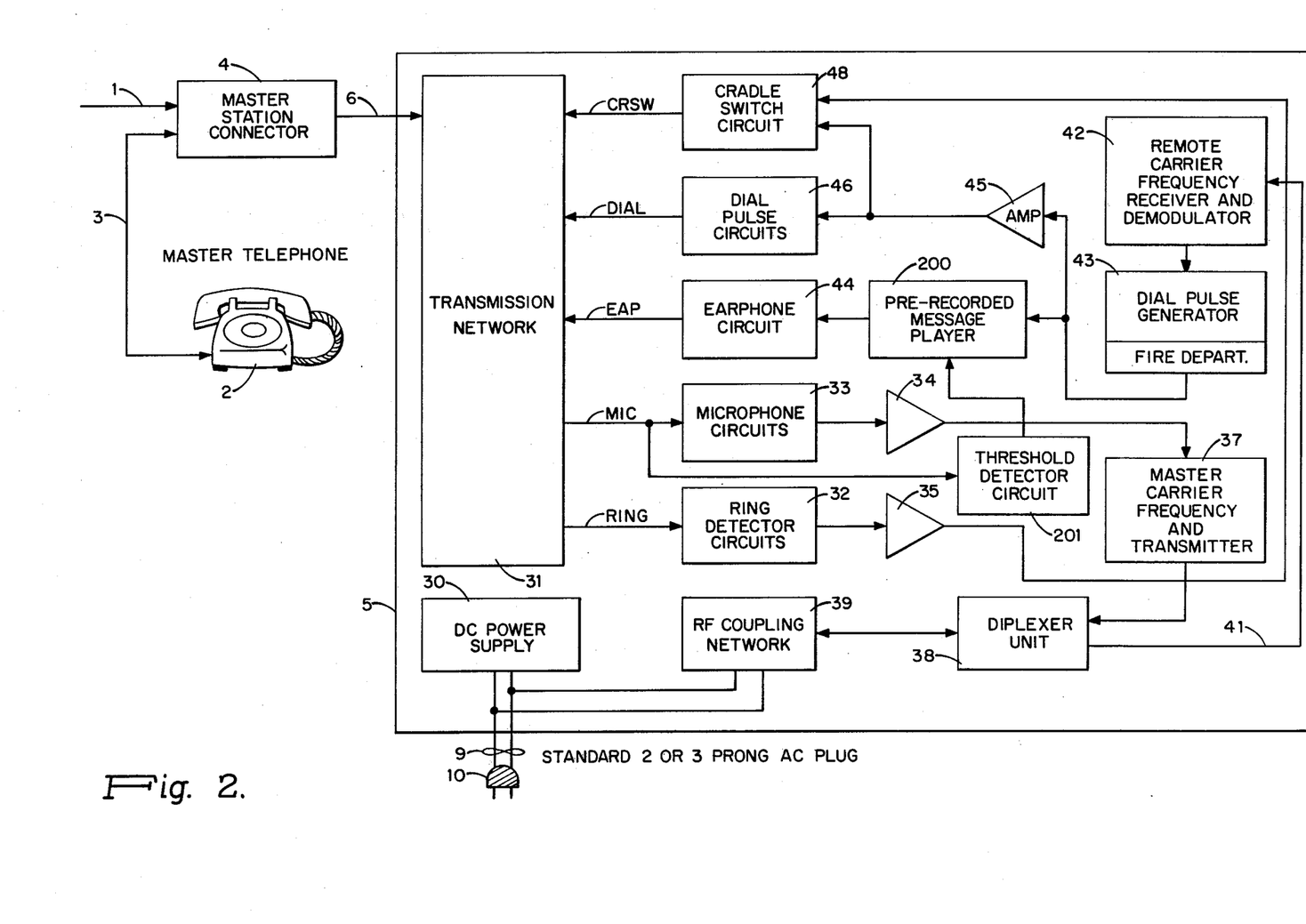
FIG. 2 is an electrical block diagram showing the principal electrical circuits at the master station between the telephone line and the available AC power wires.
Figure 3:
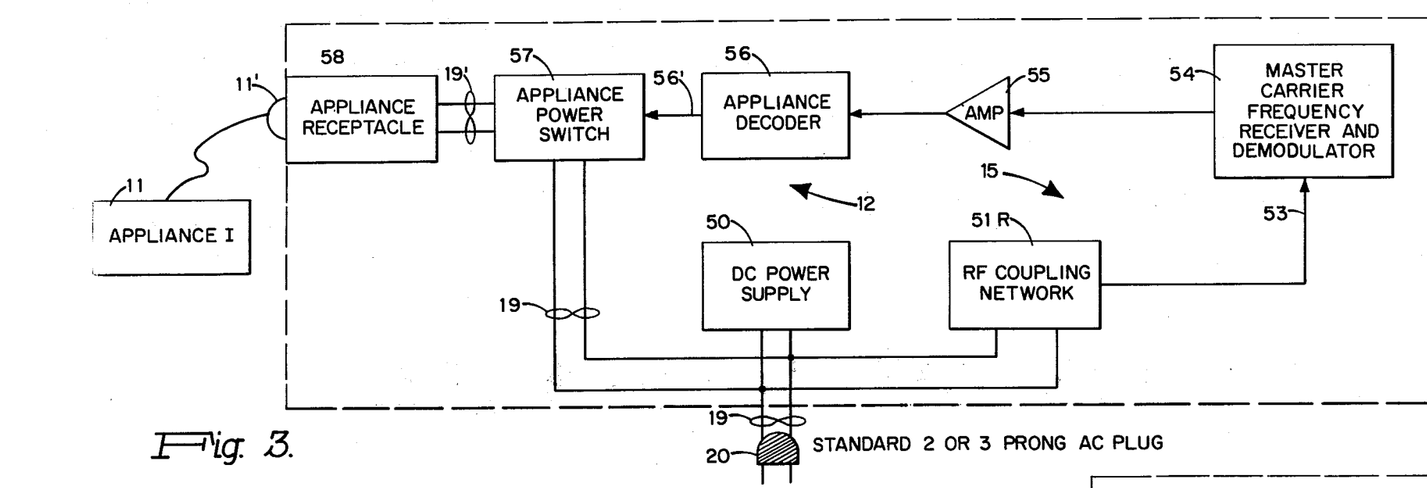
FIG. 3 is an electrical block diagram showing the principal electrical circuits at the appliance station I which receives a signal from an incoming call via the AC power line and controls an appliance.
Figure 4:
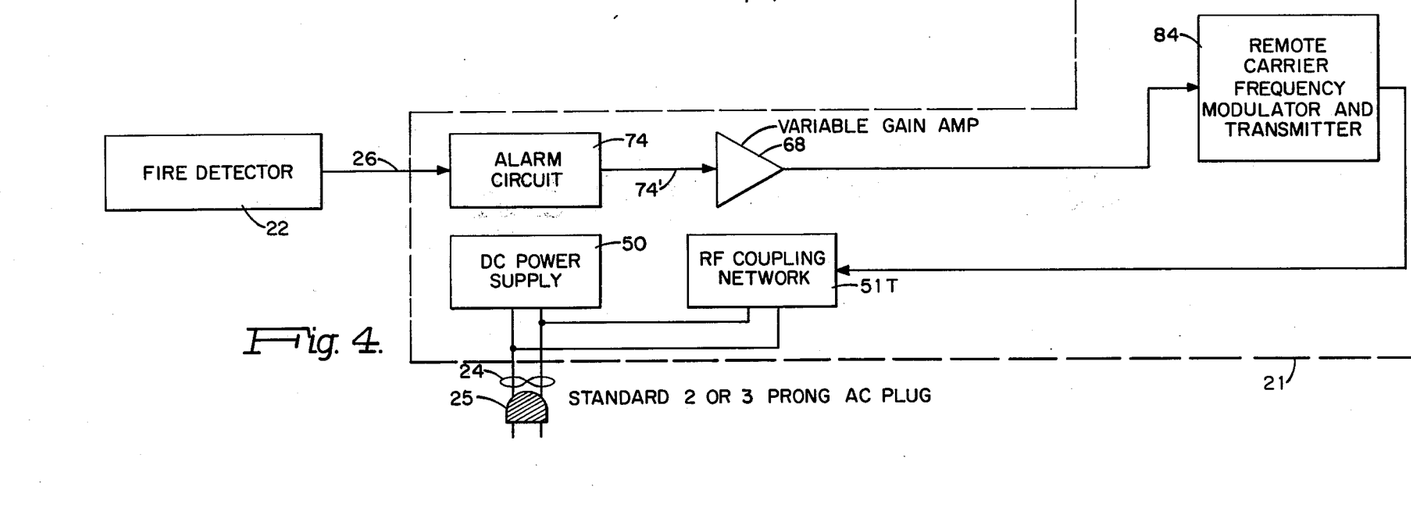
FIG. 4 is an electrical block diagram showing the principal circuits at a fire detector station which initiates a pre-recorded call, via the AC power line, to the master station telephone and from there to the fire department.

Turning next to FIGS. 2, 3 and 4, there are shown detailed block diagrams of the electrical circuits at the master and remote stations of both kinds, and particularly the master and remote T or R units and the interconnections between these units and the fire detector or appliance control.

In FIG. 2, the master unit 5 includes a conventional transmission network 31. For purposes of example, this transmission network is identified as an ITT type 75335-1 transmission network sold by International Telephone and Telegraph Company and is shown in greater detail in FIG. 8. The telephone line 1 connects directly to the input of network 31 through the connector 4 and telephone line 6. As already mentioned, lines 1, 3 and 6 may be a conventional telephone line. Two outputs of the network are denoted Ring and Mic. The Ring output is obtained from terminals G and $L_2$ of the network and carries the telephone Ring signals from the telephone line. The Mic output is obtained from terminals R and B of the network and carries the voice and special appliance control signals from the telephone line. The Ring output is fed to the Ring detector circuits 32 and the Mic output is fed to the microphone circuits 33. The outputs of these circuits are amplified by variable gain audio amplifiers 34 and 35, and are respectively fed to cradle switch circuits 48 and to the master carrier modulator transmitter 27. In this transmitter, the special appliance control signals from the telephone line modulate the master carrier frequency (also referred to herein as the first carrier frequency) and this modulated carrier is fed to a diplexer unit 38, where it is filtered and applied to one side of RF coupling network 39 which connects to the AC power wires via power line 9 and plug 10. Thus, the appliance control signals on the telephone line, initiated by the caller, modulate the master carrier frequency which is imposed on the available AC power wires at the master station for transmission to the remote station I over the power wires.

The same AC power wires also bring signals from the remote fire detector station II on a remote carrier frequency to the master unit. The signals from this remote station modulate the remote carrier frequency which feeds through plug 10 and power line 9 and through the RF coupling network 39 to diplexer unit 38. The diplexer separates the remote carrier from the master carrier frequency (if both are present) and feeds the modulated remote carrier frequency, via line 41, to the remote carrier frequency receiver and demodulator 42.

The signal from the remote fire detector station II, also called fire alarm signals, is, for example a continuous 100 KHZ tone. This signal appears in the output of demodulator 42 and is detected by dial pulse generator 43. When this tone persists for a minimum period, generator 43 produces: first a cradle switch pulse and then pre-programmed dial pulses (or dial tones) that call the fire department. The dial pulses are fed to amplifier 45 and the output of amplifier 45 is applied to the Dial Terminals of the transmission network via the dial pulse circuits 46. The dial pulses (sometimes called dial clicks) are the same as produced by a conventional rotary telephone dial. The dial pulse circuit 46 may consist of a solenoid driving a normally closed switch, the switch being connected to the F and RR terminals of the transmission network, shown in FIG. 8, the solenoid being driven by the output of amplifier 45. The master unit of this construction and function is shown in greater detail in FIG. 5.

As mentioned above, the output dial signals from the dial pulse generator are proceeded by a cradle switch pulse. The cradle switch pulse opens the telephone line through the transmission network when an alarm signal occurs. This cradle switch pulse is fed via amplifier 45 to cradle switch circuits 48 and applied to the CrSw terminals in the tip and ring lines of the transmission network shown in FIG. 8. Similarly, an incoming ring signal from ring detector circuit 32 is also fed to the cradle switch circuit. Thus, the telephone line is opened for communication by the cradle switch circuits 48 when an alarm or an incoming call occurs.

The remote station receiver unit 15, the appliance 11 and appliance control 12 of station I are shown in FIG. 3 with the major circuits thereof in blocks. The master carrier frequency in the AC power line modulated by the appliance control signals from the telephone line is fed to the remote of coupling network 51 via the plug 20 and AC power line 19. From the coupling network 51 the master frequency is fed on line 53 to the master carrier frequency receiver and demodulator 54. Thus, the output of the demodulator 54 consists of the coded signals on the subscriber's telephone line 1 which call for the control of the appliance 11 at remote Station I. These coded signals are amplified by amplifier 55 and applied to the appliance decoder circuits 56 which produces an output in line 56' that energizes the appliance power switch 57 feeding AC power to the appliance receptacle 58 on power line 19'. Thus, the appliance 11, if plugged into this receptacle by its power plug 11'is energized. The appliance switch 57 may include a preset timer that turns off the appliance power after the preset time. Or, the decoder 46 may respond to two sets of coded signals, one to turn the appliance power switch on and the other to turn it off. With this arrangement, on and off control of the appliance is with the caller who can generate the coded signals.

The remote station transmitter unit 21 and fire detector 22 are shown in FIG. 4 with the major circuits in blocks. The output of the fire detector 12 is fed to alarm circuit 74 which produces an alarm signal output in line 74' when the signal from the fire detector persists for a preset minimum time. The alarm signal output is amplified by variable gain amplifier 68. The gain of this amplifier can be adjusted in view of the attenuation of the remote carrier frequency in the AC power line between the remote station and master station. This output of amplifier 68 is fed to remote carrier frequency modulator and transmitter 84. The output of transmitter 84 carrying modulated remote carrier frequency is fed to the coupling network 51 for coupling to the AC power wires via power line 24 and plug 25. The DC power supply 50 provides DC where required in transmitter unit 21.

Figure 5:
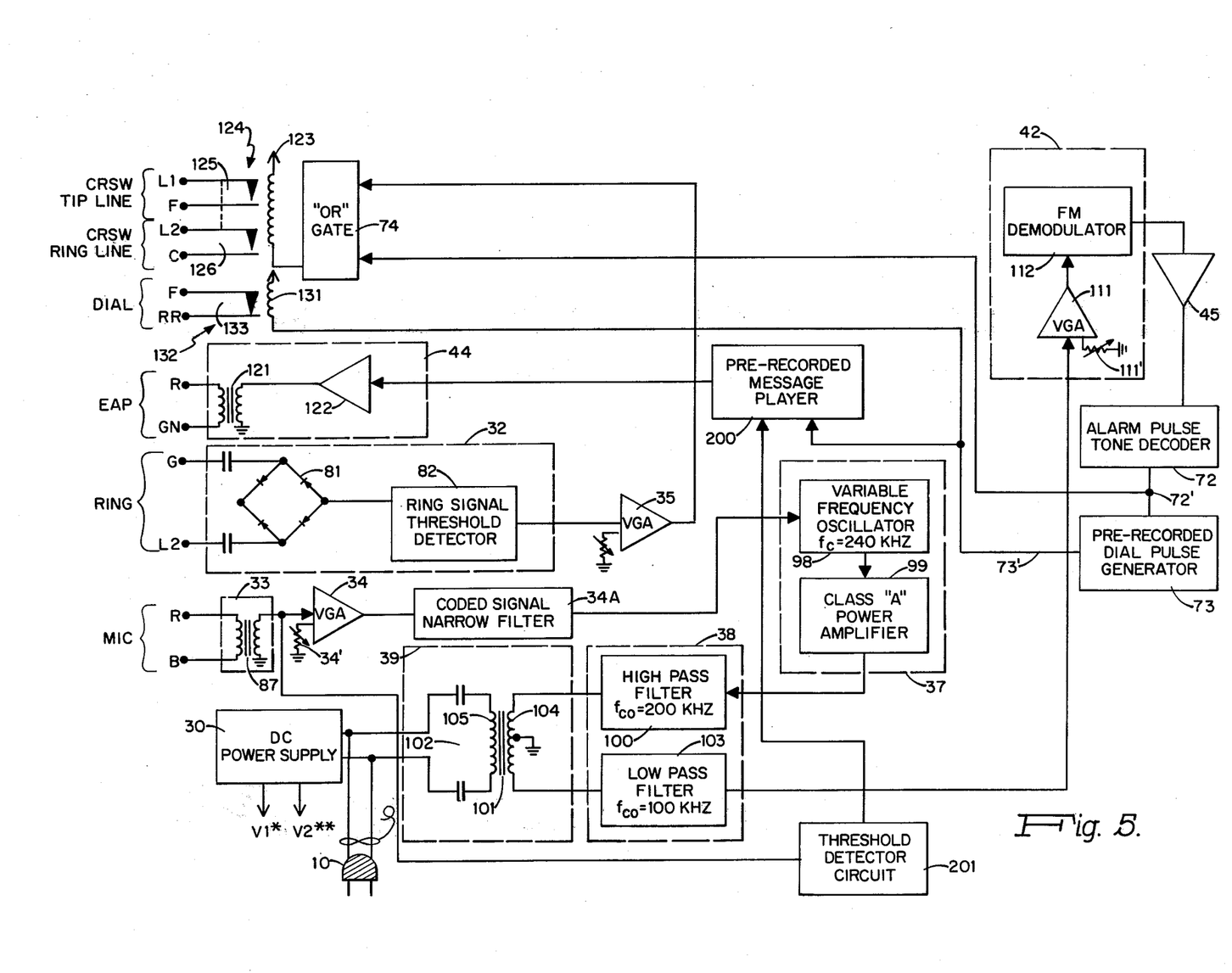
FIG. 5 is a detailed electrical block diagram and schematic of the master station transmit-receive circuits and automatic answer and call units.

Additional details of the master TR unit 5 including a few slight variations of the system shown generally in FIG. 2 are shown in FIG. 5. The circuits and components shown in FIG. 5 which are or may be the same as the circuit blocks shown in FIG. 2 which make up the master unit, bear the same reference numbers. FIG. 5 does not show the transmission network 31, but rather shows in detail the terminals of the conventional transmission network of FIG. 8 as it may be used in the master unit. This particular transmission network is identified as the ITT type 75335-1 which is part of a great many conventional telephone handsets in current use. The outputs of transmission network 31 shown in FIG. 5 are the Ring terminals and the Mic terminals. The Ring terminals are terminals G and $L_2$ to which the ring detector circuits 32 in the master unit are connected. These ring detector circuits include a full wave rectifier diode bridge circuit 81 to which the terminals G and $L_2$ of the transmission network are coupled via capacitors denoted Cr. The output of this bridge is connected to the input of the ring signal threshold detector 82 which includes a smoothing filter and the output of this detector is amplified by variable gain amplifier 35. This amplifier preferably operates over a 10% band centered at a conventional ring tone frequency such as 1,000 Hz. The gain of this amplifier is controlled by variable potentiometer 35'.

The Mic terminals of the transmission network, denoted R and B connect across the primary coil of transformer 87 which is the equivalent of the microphone circuit 33 shown in FIG. 2. The secondary of this transformer connects to the input of variable gain amplifier 34 which preferably operates over the frequency range 300 to 3300 Hz. The gain of this amplifier is controlled by variable potentiometer 34'.

The output of amplifier 34 is fed through filter 34a that passes only coded appliance control signals to the master carrier frequency modulator and transmitter 37. This modulator consists of a variable frequency oscillator 98 which is centered at a frequency substantially higher than the telephone line frequencies and higher than frequencies normally appearing in the AC power wires. For example, this frequency may be 240 KHz. The output of this oscillator is amplified by class A power amplifier 99 and fed to the high pass filter 100 in diplexer unit 38. This high pass filter has a 3 db cut off frequency of 200 KHz. Thus, the output of high pass filter 100 is the master RF or master carrier frequency which is frequency modulated by the special coded appliance control signals accompanying an incoming call on the subscriber's telephone line 1. This modulated master carrier frequency is coupled to the AC power line by the RF coupling network 39 which may consist of a RF transformer 101 which couples to the AC line 9 by capacitors Cc, denoted 102.

The RF coupling network 39 functions in both directions. That is, it couples the master carrier frequency from the transmitter 27 to the AC power line and couples the remote station (fire alarm) carrier frequency from the AC power line to the low pass filter 103 in the diplexer unit 38. In the direction from the master carrier transmitter 99 to the AC power line, the primary coil 104 of RF transformer 101 includes a center tap to ground and the capacitances 102 connect the secondary coil 105 of this transformer to the AC power wires.

The remote station carrier frequency, like the master carrier frequency, is far higher than the normal operating band of the telephone line and is higher than frequencies normally appearing in any significant amplitude in the AC power wires. However, the remote carrier frequency differs sufficiently from the master carrier frequency so that they can be discriminated readily one from the other. For example, if the master frequency is centered at 240 KHz, then the remote carrier frequency is conveniently centered at 90 KHz. Accordingly, the 3 db cut off frequency of low pass filter 103 is 100 KHz. The output of this filter (which is remote carrier frequency modulated by the alarm signal (tone) generated at the fire alarm station II), is fed to the remote carrier frequency receiver and demodulator 42. The receiver portion of this consists of a variable gain amplifier 111 and an FM demodulator circuit 112. The gain of amplifier 111 is controlled by variable potentiometer 111'.

The output of demodulator 112 consists of the fire alarm frequency tone generated at station II. For example, this alarm signal may be a narrow band tone centered at 3000 Hz. This tone appears in the output of amplifier 45 and is decoded in circuit 72 by detecting the envelope of the tone. When the alarm tone is detected a voltage signal level is produced in line 72' that initiates operation of the pre-recorded dial pulse generator 73, producing dial pulses like the pulses or clicks provided by a conventional rotary telephone dial when it is operated, that call the local fire department. The alarm signal level in line 72' preceeds the dial pulses and is fed to OR gate 74 as is also the ring output (incoming call) from amplifier 35. This OR gate is part of the cradle switch circuit 48 and energizes the solenoid 123 of normally open, switch relay 124. Hence the alarm signal level in line 72' is the equivalent of the cradle switch pulse referred to in FIG. 2.

Figure 8:
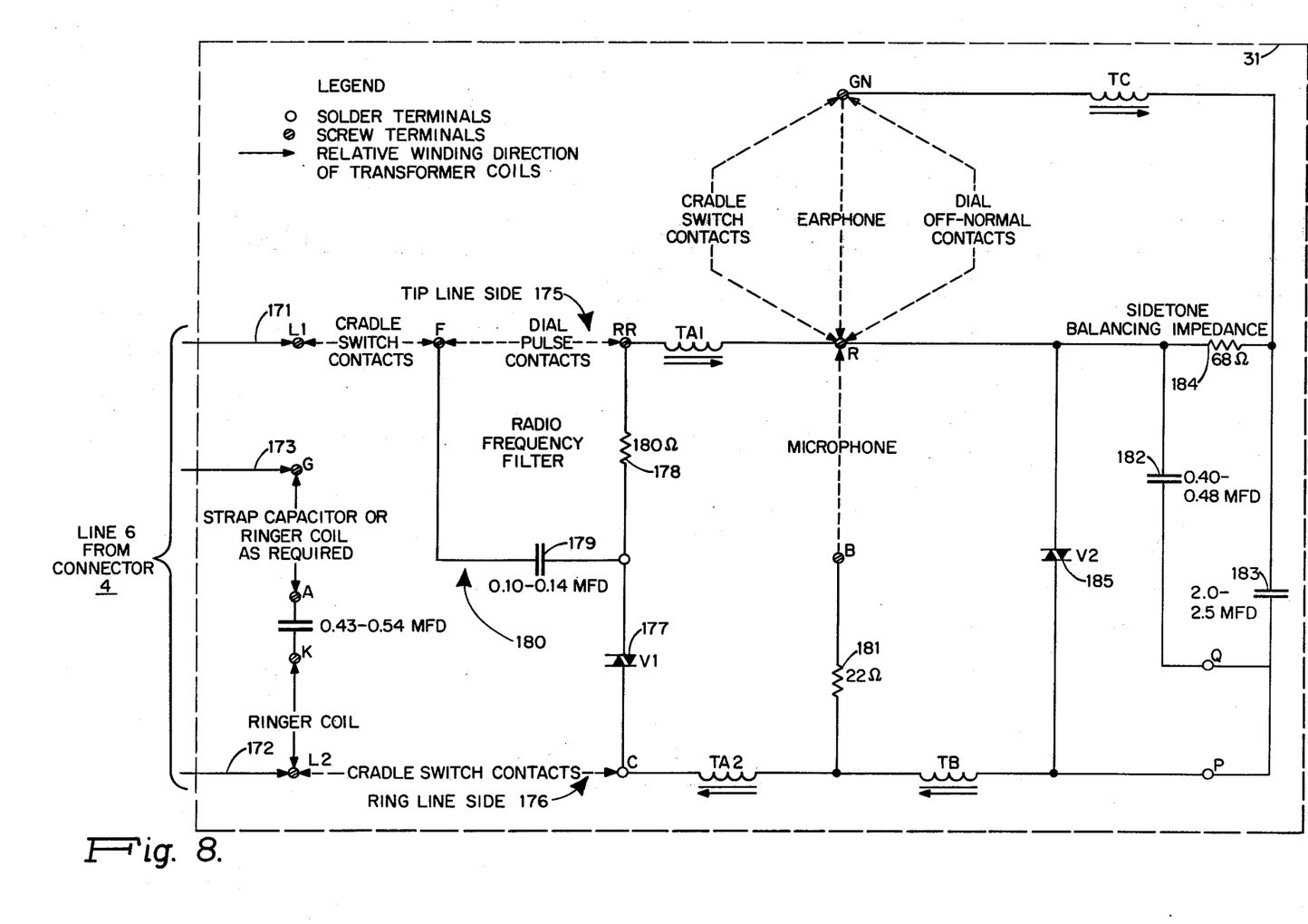
FIG. 8 is an electrical schematic of a conventional battery telephone transmission network of the type used in many conventional telephone handsets and which is for example, the ITT type 75335-1 network, and is suitable for use in the master station transmit-receive unit.

The two switches 125 and 126 of relay 124 connect to the cradle switch (CrSw) terminals of the transmission network 31 in the tip and ring lines thereof. These terminals, shown in FIG. 8, are $L_1$ and F which connect to switch 125 and $L_2$ and C which connect to switch 126.

The dial pulse from generator 73, in line 73', are applied to the solenoid 131 of relay switch 132. The switch 133 in this relay is normally closed and so each pulse causes the switch 133 to momentarily open. Since this switch connects to the Dial terminals F and RR of the transmission network 31, the dial pulses are applied to the network and from the network to the subscriber's telephone line 1 via the master connector 4. Thus, fire alarm signals originating at remote station II are carried to the master TR unit over the AC power wires and initiate generation of pre-recorded dial pulses for calling the fire department.

The dial pulses in line 73' from generator 73 are also applied to the pre-recorded audio (vocal) message player 200 placing it in a standby condition. Then, when the call to the fire department is placed and answered the pre-recorded message is played, amplified by amplifier 43 and applied to the earphone circuit 44 which transmits the message over the telephone line to the listener at the fire department. Clearly, this message should not be played until the telephone at the fire department is answered.

When the telephone at the fire department is answered and an audio signal is transmitted by that telephone, that audio signal appears in the output of microphone circuit 33 and is detected by circuit 201 which responds to received signals that exceed a threshold level selected above the level of noise and crosstalk from ring signals transmitted to the fire department telephone by the telephone company. The output of circuit 201 is fed to message player 200 and initiates playing of the record. The record is played a pre-set number of times and then shuts off.

Figure 6:
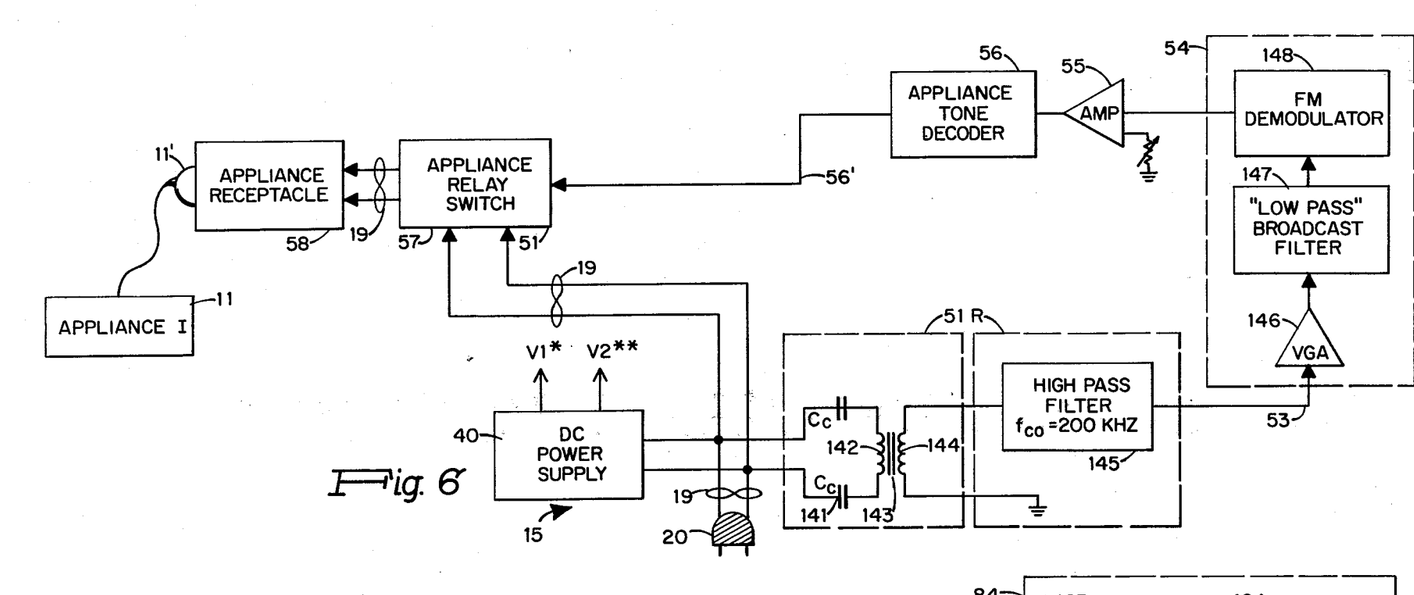
FIG. 6 is a detailed electrical block diagram and schematic of the appliance station receive and control unit.
Figure 7:
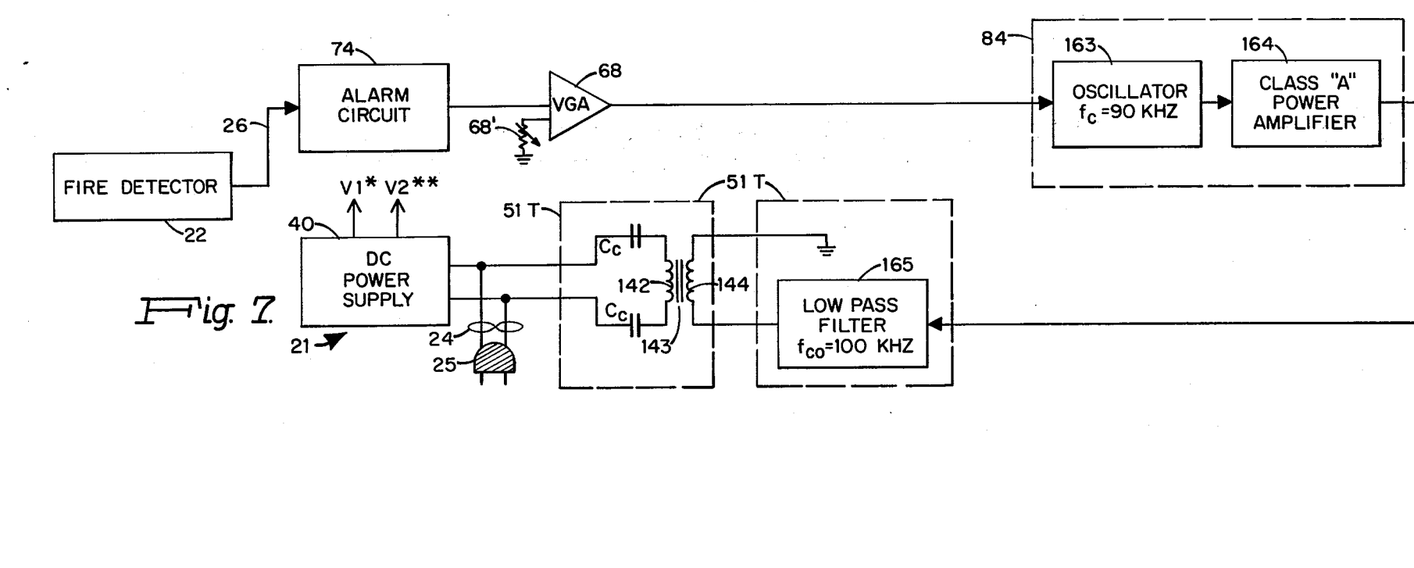
FIG. 7 is a detailed electrical block diagram and schematic of the fire detector station transmit unit.

Some circuit details of the remote stations I and II are shown in FIGS. 6 and 7, respectively. At each of these stations there is a coupling network 51 consisting of two capacitances 141 connected to the primary 142 of an RF transformer 143 (in the direction of the incoming master carrier frequency in Station I). The secondary 144 of this transformer (in the same direction in Station I) includes is grounded at one end and the master carrier frequency from this transformer feeds through high pass filter 145, cut-off at 200 KHz to the master carrier frequency receiver and demodulator 54. This receiver and demodulator consists of a variable gain amplifier 146, a low pass filter 147 and FM demodulator 148. The variable gain amplifier 146 has a narrow band of operation centered at about 240 KHz.

At the fire detector station II, the coupling network 51T is the same as the network 51R at station I, but signal flow is in the opposite direction. Here, the fire alarm circuit 74 produces an output when the signal from the fire detector persists for more than a preset minimum interval. This output is amplified by 68 and triggers oscillator 163 in the remote frequency modulator and transmitter 84, into operation producing a steady 90 KHz tone. This tone called the alarm tone is amplified by power amplifier 164 and fed through low pass filter 165 to the coupling network 51T and is coupled to the AC power line which carries the tone to the master station.

A typical ITT type 75335-1 transmission network 31 is shown in detail in FIG. 8. This network connects directly to the subscriber's telephone line as shown, the telephone line being represented by the tip and ring wires 171 and 172 and ground wire 173. The first set of terminals, which are across these lines are the Ring terminals consisting of G, A, K and $L_2$. Of these, G connects to 173, and $L_2$ connects to 172 and G and $L_2$ connect also to the ring detector circuit 32 in the master unit. The CrSw terminals $L_1$ and F in the tip line side 175 of the network connect to the normally open switch 125 of relay 124. Similarly, the CrSw terminals $L_2$ and C in the ring line side 176 of the network connect to switch 126 in the same relay. Thus, when this relay is energized by the cradle switch signal or the transfer/hold signal, terminals $L_1$ and F on the tip side and terminals $L_2$ and C on the ring side of the network are short circuited.

The dial pulse or dial click signals from generator 73 at the master station cause normally closed switch 133 of relay 132 to open then close with each pulse. The terminals of this switch connect to the Dial terminals in the tip line side of the transmission network and so these dial pulses are produced in the telephone line when these terminals are opened and closed by the switch 133.

A radio frequency filter 180, also called an equilizer circuit across the tip and ring sides of the network includes a varistor 177 in series with the combination of resistor 178 and capacitor 179. The capacitor here suppresses dial pulse transients to prevents them from causing radio interference and the resistor and the varistor form the line equilizer that acts as a shunt on short loops to limit the power transmitted by the transmission network to the telephone line and vice versa. If this power level is too high, cross talk problems occur.

The induction coil $TA_1$-TC in the tip line side and the induction coil $TA_2$-TB in the ring line side of the network are each split to balance the impedance on each side of the line. These inductances are split on each side of the Mic terminals R and B to which the microphone transformer 97 connects, as shown in FIG. 5 and imposes a load equivalent to the carbon microphone of a conventional telephone. This transformer 97 and the resistor 181 make up the network transmitter impedance of what is sometimes called the anti-sidetone circuit. The capacitors 182 and 183 and resistor 184 make up the anti-sidetone balancing impedance. Varistor 185 compensates for changes in line impedance so that desired conditions are maintained to control sidetone levels.

The earphone circuit 44, shown in FIGS. 2 and 5 at the master station, connects to the earphone terminals GN and R of the transmission network. This circuit consists of the transformer 121 at the output of variable gain amplifier 122 that amplifies voice signals derived from the pre-recorded message player 200. This transformer, 121, provides an impedance equivalent to the impedance of a conventional telephone earphone, and that impedance makes up the receiver leg of the transmission network. Varistor 185 limits the output level of the receiver leg to levels well below those which might be objectionable to the user.

Thus, the transmission network can be the same as the transmission network in a conventional telephone and all the input and output terminals of that network are provided impedances which are equivalent to those that are connected to such a network as in a conventional telephone. As a result, the signal levels and impedances imposed on the subscriber's telephone line are in all respects conventional and not particularly distinguishable from the signal levels and impedances that would be imposed by a single master telephone of conventional design connected directly to the telephone line.

The embodiments of the present invention described herein include the complete system of master TR unit and conventional master telephone on the subscriber's telephone line and remote stations of each kind, one that receives special encoded signals to control an appliance and one that transmits a fire alarm that initiates a cell and messages to, for example, a fire department. Clearly, various modifications of this complete system or portions of the system may be employed to form other embodiments of the invention all contemplated by and within the spirit and scope of the invention. Furthermore, numerous substitutions or rearrangements of the components and the sequence of operation of the components in these systems may be made without departing from the spirit and scope of the invention as set forth in the appended claims.

What is claimed is:

1. A power line telephone extension system for carrying coded signals from (1) a subscriber's telephone line of a conventional telephone communication system wherein a separate telephone line is provided from a central switching system at a central station to each subscriber at the subscriber's premises and each subscriber's telephone line includes at least two wires, the tip line and the ring line to (2) one or more remote locations at the subscriber's premises, over available electric power wires and power wire connector outlets comprising at the subscriber's premises:
   a. a subscriber's master location near said subscriber's telephone line and near one of said power wire connector outlets,
   b. one or more remote locations each near a power wire connector outlet; and
   c. at the master location;
   d. a master receiver having its input electrically coupled directly to the telephone line for receiving the coded signals carried on the telephone line,
   e. a master transmitter for transmitting the coded signals that are received to the available power wires at the subscriber's premises, and
   f. an electrically reactive coupling device for coupling the output of the master transmitter to said available power wires via a power wire connector outlet,
   g. whereby, said power wires carry the coded signals including a coded signal addressed to a particular remote location,
   h. a coded address signal detector at the particular remote location,
   i. a utilization device at said remote location, and
   j. means at the remote location responsive to the detector for detecting the particular coded address signals for controlling the utilization device,
   k. whereby the utilization device is controlled by the coded telephone line signals.

2. A power line extension system as in claim 1 wherein,
   a. a power supply is provided at the remote location for providing electric power to the coded signal detector and the utilization device control means.

3. A power line telephone extension system as in claim 2 wherein,
   a. the input of the master receiver is coupled directly to the telephone line and includes a conventional telephone transmission network which imposses a load impedance on the telephone line compatible with the telephone communication system,
   b. the coded signals carried on the telephone line are electrically coupled directly from the transmission network to the input of the master receiver,
   c. the output of the master receiver is coupled electrically directly to the input of the master transmitter,
   d. the master transmitter generates a master carrier frequency that is modulated by the coded signals from the receiver and
   e. the modulated master carrier frequency is electrically coupled directly to the power wires by said electrically reactive coupling device at the master location.

4. A system as in claim 3 wherein,
   a. the coded signals on the telephone line are frequency coded.

5. A system as in claim 3 wherein,
   a. at the remote location, connected to the power wires via a power wire connector outlet is an rf coupling network, an electrical filter tuned to the master carrier frequency, a demodulator producing the coded signals and said coded signal detector,
   b. whereby the coded signal detector produces as its output a control signal for controlling the utilization device when the coded signal is encoded for the particular remote location.

6. A power line telephone extension system for a conventional telephone communication system wherein a separate telephone line is provided from a central switching system at a central station to each subscriber at the subscriber's premises and each subscriber's telephone line includes at least two wires, the tip line and the ring line, the extension system carrying signals from one or more remote signal locations at the subscriber's premises over available electric power wires and power wire connector outlets to the subscriber's telephone line comprising, at the subscriber's premises:
   a. a master location near the subscriber's telephone line and near one of the subscriber's power wire connector outlets; and
   b. one or more of said remote locations each near a power wire connector outlet; and
   c. at the master location;
   d. a master receiver,
   e. a master transmitter,
   f. an electrically reactive coupling device for coupling the AC power wires to the input of the receiver,
   g. means electrically coupling the output of the receiver directly to the input of the transmitter,
   h. means electrically coupling the output of the transmitter directly to the telephone line, and
   i. the master transmitter includes a prerecorded telephone call signal and a prerecorded message; and
   j. at the remote location:
   k. an alarm signal transmitter responsive to a source of alarm signal, and
   l. means for coupling the output of the alarm transmitter to the power wires at the remote location,
   m. whereby the power wires carry the alarm signal to the master location and the received alarm signal at the master location initiates first transmission of the prerecorded call signals to the telephone line and then transmission of the prerecorded message to the telephone line.

7. A system as in claim 6 wherein,
   a. the remote transmitter includes a remote carrier frequency generator and a remote modulator; and
   b. the alarm signal modulates the remote carrier frequency and the modulated remote carrier frequency is transmitted to the master receiver via the power wires.

8. A system as in claim 6 wherein,
   a. the remote transmitter includes a remote carrier frequency generator and a remote modulator; and
   b. the alarm signal modulates the remote carrier frequency and the modulated remote carrier frequency is transmitted to the master receiver via the power wires.

* * * * *